United States Patent [19]

Ujikawa et al.

[11] 4,315,997
[45] Feb. 16, 1982

[54] STYRENE RESIN-BLOCK COPOLYMER COMPOSITION

[75] Inventors: Norihisa Ujikawa, Aichi; Masaharu Nakayama, Nagoya; Masaru Matsushima, Aichi, all of Japan

[73] Assignee: Nippon Oil and Fats Co., Ltd., Tokyo, Japan

[21] Appl. No.: 165,471

[22] Filed: Jul. 2, 1980

[30] Foreign Application Priority Data

Jul. 6, 1979 [JP] Japan ................................. 54-85549

[51] Int. Cl.³ ...................... C08L 53/00; C08L 25/14
[52] U.S. Cl. ..................................... 525/94; 525/904; 525/273; 525/299
[58] Field of Search ................. 525/94, 904, 273, 299

[56] References Cited

U.S. PATENT DOCUMENTS 3,706,818  12/1972  Magezi et al. ...................... 525/273
4,260,692  4/1981  Komai et al. ...................... 525/904

Primary Examiner—Carman J. Seccuro
Attorney, Agent, or Firm—Blanchard, Flynn, Thiel, Boutell & Tanis

[57] ABSTRACT

A styrene resin composition which is admixed with a styrene-vinyl acetate block copolymer is improved in the fluidity without degrading the mechanical strength and electric insulation resistance. Said vinyl acetate block polymer can easily be obtained by using a polymeric peroxide having ester bonds in the molecule thereof, notwithstanding that a copolymer of a styrene and a vinyl acetate could not be prepared easily by the prior art.

5 Claims, No Drawings

STYRENE RESIN-BLOCK COPOLYMER COMPOSITION

This invention relates to a styrene resin composition, of which the fluidity in the melting is improved without degrading its mechanical strength and electric insulation resistance.

General styrene resins are transparent, lustrous and easy to paint. Injection moldings of them are useful as scale plates of radios, televisions, electric gramaphones and the like, and parts of illuminators and recording tapes etc.

Two dimensionally drawn sheets of them are useful as light containers and shrinking wrapping for foods and miscellaneous goods.

Recently, in applying styrene resins to an injection forming, it has been desired for obtaining mold goods of complicated shape, large size or light stuff, or for increasing the cycle of the procedure, to advance the fluidity of the styrene resin in the melting.

Heretofore, many procedures for advancing the fluidity of the styrene resin have been examined. For example, as the said procedures, there have been proposed that of adjusting molecular weight of styrene resin, that of adding a plasticizer (mineral oil and the like) thereto, that of adding a lubricant thereto (stearyl alcohol etc.) and that of copolymerizing other monomers therewith.

However, even though these procedures may advance the fluidity of the polystyrene resin, they degrade concurrently the mechanical strength and electrical insulation resistance.

Accordingly, there has not been obtained a styrene resin composition which is splendid in the fluidity and also the electrical insulation resistance and mechanical strength.

SUMMARY OF THE INVENTION

An object of the present invention is to provide a styrene resin composition which is splendid in the fluidity and also the mechanical strength and electric insulation resistance.

Another object of the present invention is to provide a styrene resin composition which is suitable for molding mold good of complicated shape, large size or light stuff.

Further another object of the present invention is to provide a polystyrene resin composition which increases the cycle of molding mold goods.

The present invention is based on the knowledge that a styrene resin composition consisting of a styrene polymer and a styrene-vinyl acetate block copolymer is improved in the fluidity without undergoing a decline of its mechanical strength and electric insulation resistance and that it can be easily obtained by using a polymeric peroxide having ester bonds in the molecule. The polystyrene resin composition of the present invention is characterized in that the said polystyrene resin composition contains a styrene-vinyl acetate block polymer and a styrene polymer.

The styrene polymer of the present invention is a general grade polystyrene resin, having average molecular weight of from tens of thousands to hundreds of thousands.

A polystyrene resin composition is a mixture of a styrene-vinyl acetate block copolymer and a styrene polymer, whose composition is preferably 0.01–40.0 wt. % of styrene-vinyl acetate block copolymer and is 99.99–60.0 wt. % of styrene polymer. The content of the constitution unit based on the vinyl acetate in the polystyrene resin composition is 0.001–36.0 wt %, preferably 0.05–5 wt %.

When the content of the constitution unit based on the vinyl acetate in the styrene resin composition exceeds 36 wt %, the fluidity thereof is improved but it undergoes degradation of mechanical strength.

The styrene-vinyl acetate block copolymer is obtained by subjecting a mixture of a vinyl acetate polymer having peroxy bonds in the molecule thereof and a styrene monomer to block copolymerization. Said vinyl acetate polymer having peroxy bonds in the molecule thereof can be obtained by polymerizing vinyl acetate monomers with a polymer having peroxy bonds in the molecule thereof, hereinafter represented as a polymeric peroxide.

The styrene-vinyl acetate block copolymer is chemically combined with a styrene polymer and a vinyl acetate polymer and consists of 90–10 wt % of the constitution unit based on styrene and 10–90 wt % of the constitution unit based on vinyl acetate.

As for the polymeric peroxide, there are mentioned a diacyl type polymeric peroxide having the general formula (1), a diacyl type polymeric peroxide (2) and an ester type polymeric peroxide (3).

$$\left[ \begin{matrix} O & O & O & O \\ \| & \| & \| & \| \\ CR_1COR_2OCR_1COO \end{matrix} \right]_n \quad (1)$$

Wherein $R_1$ is an alkylene group having 1–15 carbon atoms or a phenylene group and $R_2$ is an alkylene group having 2 to 10 carbon atoms, $-(CHR_3CH_2O)_k-CH-R_3-CH_2-$ ($R_3$ is a hydrogen atom or a methyl group, k is 1–9),

and n is 2–20

$$\left[ \begin{matrix} O & O \\ \| & \| \\ OC(CH_2)_lCOO \end{matrix} \right]_m \quad (2)$$

wherein l is 1–15, and m is 2–20

$$\left[ \begin{matrix} O & O \\ \| & \| \\ R_4-OOCCHCH_2COO \\ | \\ R_5 \end{matrix} \right]_p \quad (3)$$

wherein $R_4$ is

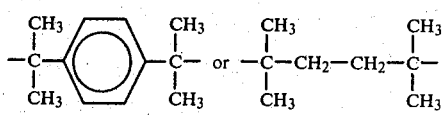

$R_5$ is a hydrogen atom $CH_3$ group or Cl atom and p is 2–20.

Representative diacyl type polymeric peroxides having formula (1), for example, may be mentioned as follows.

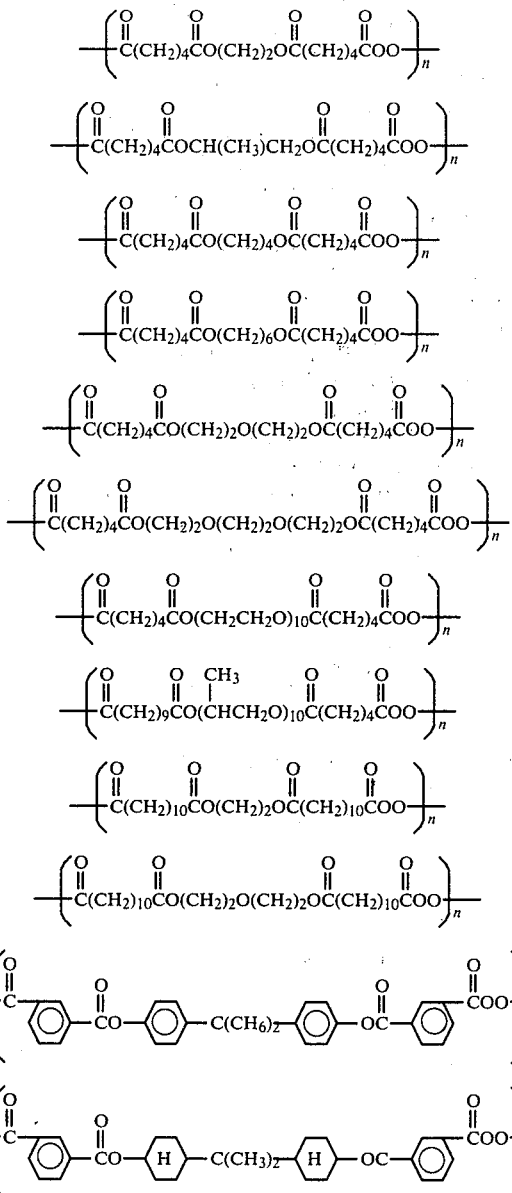

(n=2-20)

Representative ester type polymeric peroxides having formula (3), for example, may be mentioned as follows.

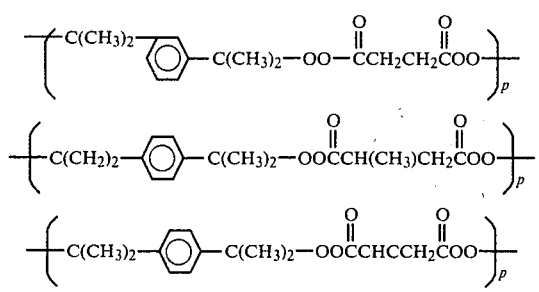

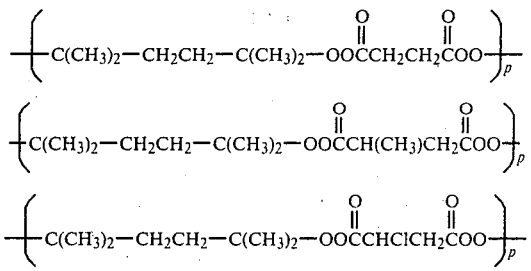

(p=2-20)

The styrene-vinyl acetate block copolymer is obtained by subjecting the said polymeric peroxide to a bulk polymerization, a suspension polymerization or a solution polymerization.

For example 100 parts by weight of a vinyl acetate monomer is admixed with 0.5-10 parts by weight of a polymeric peroxide and the resulting mixture is polymerized on the conditions that the polymerization temperature varies depending on the polymeric peroxide employed but is in the range of 60°–90° C. and the polymerization time is 2–5 hours, whereby a vinyl acetate polymer having peroxy bonds in the molecule thereof is obtained. Further, the said vinyl acetate polymer having peroxy bonds in the molecule thereof and the styrene monomer is mixed and the resulted mixture is subjected to a block copolymerization by a common bulk polymerization method, a suspension polymerization method or a solution polymerization method, whereby a styrene-vinyl acetate copolymer is obtained.

At this time, the polymerization temperature is preferably 60°–100° C. and the polymerization time is preferably 5–9 hours. The obtained styrene-vinyl acetate block copolymer consists of 90–10 wt % of the constitution unit based on the styrene and 10–90 wt % of the constitution unit of the vinyl acetate therein.

The styrene-resin composition of the present invention may be produced by mixing, melting and kneading a mixture of a styrene polymer and a styrene-vinyl acetate block copolymer with an extruder, a heating roller or a Banbury mixer.

It also may be obtained by swelling a styrene-vinyl acetate block copolymer with a styrene monomer, or dissolving the same into the styrene monomer in advance of the polymerization of the styrene monomer, followed by polymerizing the resulting mixture with benzoyl peroxide (herein after represented as BPO).

Further, it may be obtained by polymerizing a vinyl acetate polymer having peroxy bonds with a styrene monomer, using the known organic peroxide, for example BPO.

According to the present invention, the styrene resin composition is improved in the fluidity without degrading its mechanical strength and electric insulation resistance and it is adaptable for molding goods of complicated shape, large sizes or light stuffs in applying the same to an injection molding.

According to the present invention, the styrene resin composition may increase the cycle of work in injection molding thereof. The styrene resin composition of the present invention may be used for the same usage as common styrene, and it may be added with many kinds of additives such as a pigment, a lubricant, an antioxidant, an ultraviolet absorption agent, an antistatic agent, a flame retarder, a foaming agent and the like, to thereby make it into many grades of styrene resin composition.

For example, the styrene resin composition of the present invention may be admixed with an ultraviolet absorption agent, such as carbon black, orthohydroxybenzophenone and 2—(2'—hydroxyphenyl) benzotriazole, thereby obtaining a light proof styrene resin composition.

It also may admixed with a foaming agent such as pentane, hexane, heptane and the like, thereby obtaining a foaming styrene resin.

PREFERRED EMBODIMENTS OF THE INVENTION

Hereinafter, part and % shall mean part by weight and % by weight respectively

EXAMPLE 1

[Preparation of polystyrene resin Composition]

A polystyrene resin composition was prepared by the following (a)-(c) procedures.

(a) procedure; preparation of a vinyl acetate polymer having peroxy bonds in the molecule thereof Into a flask having four openings which is equipped with a thermometer, a stirring and a reflux condenser, there were added a mixed solution having the following composition of

| Vinyl acetate monomer | 500 parts |
|---|---|
| $\left(-C(CH_2)_4\overset{O}{\underset{\parallel}{C}}-O(CH_2)_4O\overset{O}{\underset{\parallel}{C}}(CH_2)_4COO-\right)_n$ n : 5 | 25 parts |
| Completely saponificated polyvinyl alcohol (polymerization degree : 1700, content of acetyl group : 1 mol %) | 21 parts |
| Partially saponificated polyvinyl alcohol (polymerization degree : 1700, content of acetyl group : 1 mole %) | 0.6 part |
| Water | 3000 parts | and the contents of the flask were heated at 60° C., followed by subjecting to polymerization at the same temperatures for 2.5 hours while introducing nitrogen gas.

The resulting product was filtered off, followed by washing with water and drying, whereby 485 parts of vinyl acetate polymer having peroxy bonds were obtained in a transparent pearl state.

(b) Procedure; preparation of styrene-vinyl acetate block copolymer

Into the same flask as used in (a) procedure, there were placed a mixed solution having the following composition of

| Styrene monomer | 500 parts |
|---|---|
| Vinyl acetate polymer having peroxy bonds in the molecule thereof (prepared by (a) procedure) | 500 parts |
| Completely saponificated polyvinyl alcohol | 21 parts |
| Partially saponificated polyvinyl alcohol | 0.9 part |
| Water | 3000 parts | and the content of the flask was heated up to 80° C., followed by subjecting to polymerization at the same temperature for 7.5 hours.

The resulting polymer was washed off, followed by washing with water and drying, whereby 975 parts of styrene-vinyl acetate block copolymer whose constitution unit based on the vinyl acetate was 50%. were obtained in a pearl state.

(c) Procedure, preparation of styrene resin composition

A mixture of 99.98 parts of styrene polymer which is of general purpose average fluidity grade and whose molecular weight is about 75.000 [production of Mitsubishi Monsanto Co., Ltd, trade mark: High Flow 77 (hereinafter represented as HF-77)] and 0.02 part of styrene-vinyl acetate block copolymer which was obtained by (b) procedure was melted and mixed with a screw type extruder machine having one rotary shaft at 220° C., thereby obtaining a styrene resin composition.

The obtained styrene resin composition was examined about its physical properties, namely the fluidity, electrical insulation resistance and mechanical property according to the following methods. The obtained results are shown in Table 1.

(1) Fluidity

Fluidity of a styrene resin composition was measured by a method which comprises the steps of melting the styrene resin composition in an injection molding machine having a spiral mold, flowing out the said styrene resin composition from the spiral mold and measuring the length of the flowed out styrene resin composition.

The sectional shape of the spiral mold is a semicircle having a diameter of 0.3 cm. The measuring conditions were as follows.

Temperature of the injection molding machine—205° C.

Temperature of the mold—30° C.

Oil pressure—10 kg/cm$^2$

Cycle—30 seconds (2) Electrical insulation resistance

A test piece of a sample which was a disc having a diameter of 8 cm and a thickness of 0.5 cm was prepared by a vertical injection forming machine. The said test piece was measured about the characteristic volume resistance according the Japanese Industrial Standard Method K-6911

(A general test method for a thermosetting plastic resin).

The preparing conditions of the test piece were as follows.

Temperature of the injection molding machine—210° C.

Oil pressure—50 kg/cm$^2$ (3) Mechanical strength

A sample plate of a polystrene resin composition was prepared by a press forming machine. The test piece having notches was cut from the sample plate according to Japanese Industrial Standard Method K-7110 (testing method of Izod impact value for hard plastic resins) and was examined about the Izod impact value according to JISK 7110. The press forming conditions were as follows.

Press forming temperatures—190° C.

Press forming hour—20 min

Pressure—100 kg/cm$^2$

EXAMPLE 2-7

Respective styrene resin compositions were prepared according to the same procedures as that described in Example 1 except that in the procedure (c) of Example 1 for preparing styrene resin, mixing ratios of HF-77 and styrene-vinyl acetate block copolymer were changed respectively as shown in Table 1.

Respectively obtained products were estimated about their fluidity, electric insulation resistance and mechanical strength.

The obtained results are shown in Table 1. Comparative Example 1-2

A test piece of Comparative Example 1 and that of Comparative Example 2 were made of HF-77 and a general high grade styrene having an average molecular weight of about 55.000 [production of Mitsubishi Monsanto Co., Ltd, trade mark Hf-55 (hereinafter represented as Hf-55)], respectively according to the same procedures as that described in Example 1.

Respective test pieces were estimated about their fluidity, electric insulation resistance and mechanical strength respectively, according to the same procedures as described in Example 1.

The obtained results were shown in Table 1.

It is apparent from Table 1 that the addition amount of styrene-vinyl acetate block copolymer to the polystyrene resin composition improved the physical properties thereof and that the fluidity of the polystyrene resin composition of Example 1 was superior to that of HF-77.

It was also recognized from Table 1 that the polystyrene resin compositions of Example 2-7 were improved in the fluidity than Comparative Example 1 and they were same or more in the fluidity, compared with HF-55 which is peculiar to be of high fluidity.

It was further recognized that the polystyrene resin composition of the present invention was improved in the fluidity without degrading the electric insulation resistance and the mechanical strength, compared with HF-55 and HF-77.

Example 1, except that in (a) procedure of Example 1

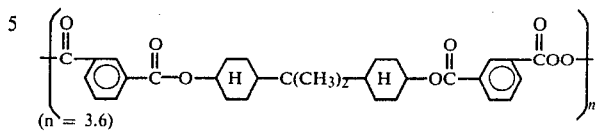

(n = 3.6)

was used as the polymeric peroxide in place of

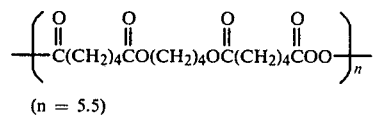

(n = 5.5)

and that in (c) procedure of Example 1, the mixing ratios of HF-77 and the styrene-vinyl acetate block copolymers were as shown in Table 2.

The obtained products were examined respectively about their fluidity, electric insulation resistance and mechanical strength according to the same procedures as described in Example 1. The obtained results are shown in Table 2.

It is recognized from Table 2 that the styrene resin compositions of Example 8-14 were respectively improved much higher in the fluidity, compared with that of comparative Example 1 and that they were equal to or higher than that of Comparative Example 2 in which HF-55 having a characteristic of high fluidity was used, in the fluidity.

TABLE 1

| | Mixing ratio | | | Physical Properties | | |
|---|---|---|---|---|---|---|
| | Styrene Polymer | | *1 Addition amount of St-VAc block copolymer (wt %) | *2 Content of constitution unit based on VAc (wt %) | | |
| | Kind | Addition amount (wt %) | | | Fluidity (cm) | Characteristic volume resistance (Ω/cm) | Izod impact value (kgfcm/cm) |
| Example | | | | | | | |
| 1 | *3HF - 77 | 99.98 | 0.02 | 0.01 | 16.4 | $2.0 \times 10^{17}$ | 1.5 |
| 2 | " | 99.9 | 0.1 | 0.05 | 20.8 | $2.1 \times 10^{17}$ | 1.5 |
| 3 | " | 99 | 1 | 0.5 | 30.6 | $2.3 \times 10^{17}$ | 1.6 |
| 4 | " | 98 | 2 | 1 | 30.7 | $2.6 \times 10^{17}$ | 1.7 |
| 5 | " | 90 | 10 | 5 | 28.8 | $7.4 \times 10^{17}$ | 1.5 |
| 6 | " | 80 | 20 | 10 | 26.7 | $1.5 \times 10^{17}$ | 1.5 |
| 7 | " | 60 | 40 | 20 | 24.1 | $1.3 \times 10^{17}$ | 1.4 |
| Comparative Example | | | | | | | |
| 1 | " | 100 | — | — | 14.7 | $2.0 \times 10^{17}$ | 1.5 |
| 2 | *4HF - 55 | 100 | — | — | 20.0 | $2.0 \times 10^{7}$ | 1.5 |

Note:
*1 Vac means vinyl acetate
*2 Content of constitution unit based on VAc in the styrene resin composition
*3 HF - 77 is a polymer of general purpose fluidity grade having molecular weight of about 77,000.
*4 HF - 55 is a general purpose high grade fluidity styrene having molecular weight of about 55,000

EXAMPLE 8-14

Respective styrene resin compositions were prepared according to the same procedures as that described in It is further recognized from Table 2 that the styrene-resin compositions of the present invention were improved in the fluidity, without degrading their electric insulation resistance and mechanical strength, comparing with HF-77 and HF-55.

TABLE 2

| Example | Mixing ratio Styrene Polymer Kind | Styrene Polymer Addition amount (wt %) | *1 Addition amount of St-VAc block copolymer (wt %) | *2 Content of constitution unit based on VAc (wt %) | Fluidity (cm) | Charateristic volume resistance (Ω/cm) | Izod impact value (kgfcm/cm) |
|---|---|---|---|---|---|---|---|
| 8 | *3HF - 77 | 99.98 | 0.02 | 0.01 | 16.5 | $2.0 \times 10^7$ | 1.5 |
| 9 | " | 99.9 | 0.1 | 0.05 | 20.7 | $2.0 \times 10^7$ | 1.5 |
| 10 | " | 99 | 1 | 0.5 | 30.5 | $2.3 \times 10^{17}$ | 1.6 |
| 11 | " | 98 | 2 | 1 | 30.6 | $2.5 \times 10^{17}$ | 1.6 |
| 12 | " | 90 | 10 | 5 | 28.9 | $7.0 \times 10^{17}$ | 1.5 |
| 13 | " | 80 | 20 | 10 | 26.5 | $2.0 \times 10^7$ | 1.5 |
| 14 | " | 60 | 40 | 20 | 24.2 | $1.4 \times 10^{17}$ | 1.4 |

Note:
*1 VAc means vinyl acetate
*2 Content of constitution unit based on VAc in the styrene resin composition
*3 a general purpose fluidity grade styrene having average molecular weight of about 77,000

EXAMPLE 15

(1) Preparation of a polystyrene resin composition which was polymerized with a styrene and a styrene-vinyl acetate block copolymer Into a flask having four openings which is equipped with a thermometer, a stirrer and a reflux condenser, there were added 99.98 parts of styrene monomer, 0.02 part of styrene-vinyl acetate block copolymer which was prepared according to Example 1, 0.5 part of benzoyl peroxide, 21 parts of completely saponificated polyvinyl alcohol, 0.9 part of partially saponificated polyvinyl alcohol and 600 parts of water and the content of the flask was heated up to 80° C. while introducing nitrogen gas therein and was polymerized at the same temperature for 8 hours. The obtained polymer was filtered off, followed by washing with water and drying, thereby obtaining 98 parts of the polymer in a pearl state.

The said pearl polymer was separated into the ingredients thereof by a separative-precipitation using a benzenecyclohexane system solvent and a methylethyl ketone-ethanolwater system solvent. The obtained respective ingredients thereof were identified by subjecting the same to nuclear magnetic resonance spectrum analysis.

The obtained result showed that the pearl polymer contained 99.98% of styrene and 0.02% of styrene-vinyl acetate copolymer and that the content of the constitution unit based on the vinyl acetate in the obtained product was 0.01% and that there was no change in the composition ratio of the styrene to the vinyl acetate block copolymer before and after the copolymerization within the range of the experimental error.

The obtained product was examined about its fluidity, electric insulation resistance and mechanical strength, according to the same procedures as described in Example 1. The obtained results are shown in Table 3.

EXAMPLE 16-17

Respective styrene resin compositions were prepared, according to the same procedures as that described in Example 15, except that the mixing ratios of styrene monomer to styrene-vinyl acetate block copolymer were changed to 99.9:0.1 and 99.0:1.0 respectively.

The obtained products were respectively examined about their properties, according to the same procedures as in Example 15. The obtained results are shown in Table 3.

EXAMPLE 18-21

Preparation of a styrene resin composition which was obtained by polymerizing styrene monomers and concurrently copolymerizing styrene monomers and vinyl acetate having peroxy bonds in the molecule thereof in the presence of BPO.

In the same flask as used in Example, there were charged a mixed solution having the following composition of Styrene monomer—99 parts
Vinyl acetate having peroxy bonds in the molecule thereof (prepared by Example 1)—1 parts
Completely saponificated polyvinyl alcohol—21 parts
Partially saponificated polyvinyl alcohol—0.9 part
Water—600 parts The content of the flask was heated up to 80° C. while introducing nitrogen gas therein and was polymerized at the same temperature for 4 hours, whereby an intermediate polymer solution was obtained.

A small quantity of sample was taken from the said intermediate polymer solution and it was subjected to a separative precipitation according to the same procedure as described in Example 15. It was found from this procedure that there was no occurrence of a styrene polymer and a vinyl acetate polymer and that a styrene-vinyl acetate block copolymer was occurred and that there existed 65 wt % of an unreacted styrene monomer.

It was also found from the measurement of the active oxygen in the sampling solution by iodometry that the all peroxy bonds in the vinyl acetate polymers having peroxy bonds were decomposed.

To the intermediate polymer solution, 0.5 part of BPO was added and the resulting mixture was subjected to a polymerization for 2 hours.

TABLE 3.

| Example | Addition amount Styrene monomer | Addition amount Styrene-VAc block copolymer | Addition amount VAc polymer having peroxy bonds | Addition amount BPO | Constitution of styrene resin composition Styrene polymer | Constitution of styrene resin composition St-VAc block copolymer | Constitution of styrene resin composition Content of constitution unit based (VAc*1) | Physical Properties Fluidity (cm) | Physical Properties Characteristic volume resistance ($\Omega$/cm) | Physical Properties Izod impact value (kgfcm/cm) |
|---|---|---|---|---|---|---|---|---|---|---|
| 15 | 99.98 | 0.02 | — | 0.5 | 99.98 | 0.02 | 0.01 | 16.5 | $2.0 \times 10^{17}$ | 1.5 |
| 16 | 99.9 | 0.1 | — | 0.5 | 99.9 | 0.1 | 0.05 | 21.2 | $1.8 \times 10^{17}$ | 1.6 |
| 17 | 99 | 1 | — | 0.5 | 99 | 1 | 0.5 | 31.0 | $1.6 \times 10^{17}$ | 1.5 |
| 18 | 99 | — | 1 | 0.5 | 65 | 35 | 1 | 33.8 | $1.5 \times 10^{17}$ | 1.5 |
| 19 | 95 | — | 5 | 0.5 | 63 | 37 | 5 | 30.1 | $1.5 \times 10^{17}$ | 1.4 |
| 20 | 90 | — | 10 | 0.4 | 64 | 36 | 10 | 26.8 | $9.0 \times 10^{16}$ | 1.5 |
| 21 | 80 | — | 20 | 0.4 | 63 | 37 | 20 | 24.3 | $8.5 \times 10^{16}$ | 1.4 |

Note:
*1 Content of constitution unit based on the vinyl acetate in the styrene resin composition The obtained polymer was filtered off, followed by washing with water and drying, whereby 98.5 parts of a styrene resin composition, whose composition was shown in Example 18, were obtained. According to the same procedures as described in the foregoing, respective polystyrene resin compositions whose compositions were shown in Example 19–21 on Table 3, were obtained.

The styrene resin compositions of Example 15–21 were respectively examined about their physical properties according to the same procedures as in Example 1. The obtained results were shown in Table 3.

It was recognized from Table 3 that the styrene resin compositions were improved in their fluidity without degrading the electric insulation resistance and mechanical strength.

EXAMPLE 22-28

Styrene resin compositions were respectively prepared, according to the same procedures as that described in Example 15-21, except that the styrene-vinyl acetate block copolymer prepared in Example 8 was used in place of the styrene-vinyl acetate block copolymer prepared in Example 1 and that the vinyl acetate polymer having peroxy bonds in the molecule thereof, which was prepared in Example 1, was used in place of the vinyl acetate polymer having peroxy bonds in the molecule thereof which was prepared in Example 8.

The obtained products were respectively examined about their properties as in the foregoing. The obtained results are shown in Table 4.

Comparative Example 3–9

Preparation of a mixed resin of styrene polymer and vinyl acetate polymer

In the same flask employed for Example 1, there were charged a mixed solution having the following composition of:

Vinyl acetate monomer—100 parts
1% polyvinyl alcohol aqueous solution—200 parts
White carbon (production of Nippon aerosil Co., Ltd, trade mark: Aerosil 200)—4.5 parts
BPO—0.6 part The content of the flask was heated up to 65° C. and was kept at the same temperature for 3 hours while introducing nitrogen gas therein, followed by heating the same up to 70° C. and polymerizing the same for 2 hours. The obtained polymer was filtered off, followed by washing with water and drying, whereby 90 parts of vinyl acetate polymer were obtained.

The obtained vinyl acetate polymer and HF-77 were respectively mixed in the mixing ratio as shown in Table 5, according to the same procedures as described in Example 1.

The respectively mixed resins were examined about their physical properties. The obtained results were shown in Table 5.

It was recognized from Table 5 that when a styrene polymer and a vinyl acetate polymer were mixed mechanically, as the content of the constitution unit based on the vinyl acetate in the mixed resin, both the fluidity and electric insulation resistance thereof became degraded.

TABLE 4

| Example | Addition amount Styrene monomer | Addition amount Styrene-VAc block copolymer | Addition amount VAc polymer having peroxy bonds | Addition amount BPO | Constitution of styrene resin composition Styrene polymer | Constitution of styrene resin composition St-Vac block copolymer | Constitution of styrene resin composition Content of constitution unit based on VAc | Physical Properties Fluidity (cm) | Physical Properties Characteristic volume resistance ($\Omega$/cm) | Physical Properties Izod impact value (kgfcm/cm) |
|---|---|---|---|---|---|---|---|---|---|---|
| 22 | 99.98 | 0.02 | — | 0.5 | 99.98 | 0.02 | 0.01 | 16.5 | $2.0 \times 10^{17}$ | 1.5 |
| 23 | 99.9 | 0.1 | — | 0.5 | 99.9 | 0.1 | 0.05 | 20.7 | $2.0 \times 10^{17}$ | 1.5 |
| 24 | 99 | 1 | — | 0.5 | 99 | 1 | 0.5 | 30.5 | $2.3 \times 10^{17}$ | 1.6 |
| 25 | 99 | — | 1 | 0.5 | 63 | 37 | 1 | 32.0 | $1.6 \times 10^{17}$ | 1.5 |
| 26 | 95 | — | 5 | 0.5 | 64 | 36 | 5 | 30.0 | $1.5 \times 10^{17}$ | 1.5 |
| 27 | 90 | — | 10 | 0.4 | 65 | 35 | 10 | 26.5 | $9.0 \times 10^{16}$ | 1.4 |
| 28 | 80 | — | 20 | 0.4 | 63 | 37 | 20 | 24.0 | $8.3 \times 10^{16}$ | 1.4 |

TABLE 5

| Comparative Example | Mixing Ratio | | Content of constitution unit based on VAc*[1] (wt %) | Physical Properties | |
| --- | --- | --- | --- | --- | --- |
| | Addition amount of HF-77 (wt %) | Addition amount of VAc polymer (wt %) | | Fluidity (cm) | Characteristic volume resistance (Ω/cm) |
| 3 | 99.99 | 0.01 | 0.01 | 14.7 | $1.9 \times 10^{17}$ |
| 4 | 99.95 | 0.05 | 0.05 | 14.4 | $1.8 \times 10^{17}$ |
| 5 | 99.9 | 0.1 | 0.1 | 14.2 | $1.6 \times 10^{17}$ |
| 6 | 99 | 1 | 1 | 14.0 | $9 \times 10^{16}$ |
| 7 | 95 | 5 | 5 | 13.8 | $6 \times 10^{16}$ |
| 8 | 90 | 10 | 10 | 13.7 | $5.3 \times 10^{16}$ |
| 9 | 80 | 20 | 20 | 13.2 | $3.3 \times 10^{16}$ |

Note:
*[1] Content of constitution unit based on vinyl acetate in the mixed resin The embodiments of the invention in which an exclusive property or privilege is claimed are defined as follows:

1. A styrene resin composition which consists of 0.01–40 wt % of a styrene-vinyl acetate block copolymer and 99.99–60 wt % of a styrene polymer, said styrene-vinyl acetate block copolymer consisting of 90–10 wt % of the constitution unit based on the styrene and 10–90 wt % of the constitution unit based on the vinyl acetate and is prepared by copolymerizing a vinyl acetate polymer having peroxy bonds in the molecule thereof with styrene monomers, said vinyl acetate polymer having peroxy bonds in the molecule thereof being prepared by polymerizing vinyl acetate monomers with a polymer having peroxy bonds in the molecule which is selected from the group consisting of diacyl type polymeric peroxides having the following formula (1), diacyl type polymeric peroxides having the following formula (2) and ester type polymeric peroxides having the following formula (3)

$$\left[ \begin{array}{cc} O & O \\ \| & \| \\ -CR_1COR_2OCR_1COO- \end{array} \right]_n \quad (1)$$

wherein $R_1$ is an alkylene group having 1–15 carbon atoms or a phenylene group and $R_2$ is an alkylene group having 2 to 10 carbon atoms, $-(CHR_3CH_2O)_k-CH-R_3-CH_2-$ ($R_3$ is a hydrogen atom or a methyl group, K is 1–9),

and n is 2–20

$$\left[ \begin{array}{c} O \quad O \\ \| \quad \| \\ -OC(CH_2)_lCOO- \end{array} \right]_m \quad (2)$$

wherein l is 1–15, and m is 2–20

$$\left[ \begin{array}{c} O \quad O \\ \| \quad \| \\ -R_4-OOCCHCH_2COO- \\ \qquad | \\ \qquad R_5 \end{array} \right]_p \quad (3)$$

wherein $R_4$ is

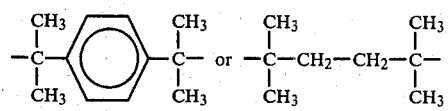

$R_5$ is a hydrogen atom, $CH_3$ group or Cl atom and p is 2–20.

2. A styrene resin composition as claimed in claim 1 in which the styrene-vinyl acetate block copolymer and the styrene polymer are prepared respectively, followed by mixing with the two in the predetermined mixing ratio.

3. A styrene resin composition as claimed in claim 1 in which the mixture of the styrene-vinyl acetate block copolymer and the styrene polymer which is composed in the predetermined mixing ratio, is prepared by polymerizing styrene monomers and concurrently copolymerizing styrene monomers with vinyl acetate having peroxy bonds in the molecule thereof in the presence of the organic peroxide.

4. A styrene resin composition as claimed 1 in which the styrene-vinyl acetate block copolymer is swelled with the styrene monomer in advance of the polymerization of the styrene monomer, and the resulting mixture is polymerized in the presence of the organic peroxide.

5. A styrene resin composition as claimed in claim 1 in which the styrene-vinyl acetate block copolymer is dissolved into the styrene monomer in advance of the polymerization of the styrene monomer and the resulting mixture is polymerized in the presence of the organic peroxide.

* * * * *

UNITED STATES PATENT AND TRADEMARK OFFICE
CERTIFICATE OF CORRECTION

PATENT NO. : 4 315 997
DATED : February 16, 1982
INVENTOR(S) : Norihisa Ujikawa et al It is certified that error appears in the above—identified patent and that said Letters Patent is hereby corrected as shown below:

Column 14, line 52; after "claimed" insert ---in claim---.
Column 14, line 58; after "claimed" insert ---in claim---.

Signed and Sealed this

Eighth Day of February 1983

[SEAL]

Attest:

GERALD J. MOSSINGHOFF

Attesting Officer     Commissioner of Patents and Trademarks